United States Patent
Kwon et al.

(10) Patent No.: US 11,102,154 B2
(45) Date of Patent: Aug. 24, 2021

(54) METHOD, SYSTEM, APPARATUS, AND NON-TRANSITORY COMPUTER-READABLE RECORDING MEDIUM FOR PROVIDING A COPIED MESSAGE LIST

(71) Applicant: LINE Plus Corporation, Seongnam-si (KR)

(72) Inventors: Soon Ho Kwon, Seongnam-si (KR); Eun Hyuk Kim, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/446,806

(22) Filed: Jun. 20, 2019

(65) Prior Publication Data

US 2020/0014641 A1 Jan. 9, 2020

(30) Foreign Application Priority Data

Jul. 4, 2018 (KR) .................. 10-2018-0077476

(51) Int. Cl.
*H04L 12/58* (2006.01)

(52) U.S. Cl.
CPC ............ *H04L 51/046* (2013.01); *H04L 51/08* (2013.01); *H04L 51/10* (2013.01); *H04L 51/16* (2013.01)

(58) Field of Classification Search
CPC ....... H04L 51/046; H04L 51/08; H04L 51/16; H04L 51/10
See application file for complete search history.

(56) References Cited

U.S. PATENT DOCUMENTS

| | | | | |
|---|---|---|---|---|
| 5,794,039 A | * | 8/1998 | Guck | ................... H04L 29/06 |
| 8,073,830 B2 | * | 12/2011 | Fontes | ................ G06F 16/951 |
| | | | | 707/706 |
| 2006/0174207 A1 | * | 8/2006 | Deshpande | .......... G06Q 10/107 |
| | | | | 715/758 |
| 2010/0138502 A1 | * | 6/2010 | Miller | ................ G06F 9/543 |
| | | | | 709/206 |
| 2010/0138503 A1 | * | 6/2010 | Ishikawa | ............ H04L 12/1813 |
| | | | | 709/206 |

(Continued)

FOREIGN PATENT DOCUMENTS

| | | |
|---|---|---|
| KR | 10-2002-0074304 A | 9/2002 |
| KR | 10-1109339 B1 | 2/2012 |

(Continued)

OTHER PUBLICATIONS

Korean Office Action dated May 22, 2019 for corresponding Korean Application No. 10-2018-0077476.

*Primary Examiner* — John A Follansbee
*Assistant Examiner* — Lam T Do
(74) *Attorney, Agent, or Firm* — Harness, Dickey & Pierce, P.L.C.

(57) ABSTRACT

A message providing method, system, apparatus, and/or non-transitory computer readable recording medium thereof may include storing at least one message selected from a chatroom of a messenger; and transmitting the stored at least one message and data information associated with the corresponding message through a specific chatroom in response to a selection on the specific chatroom. A user-side client included in the specific chatroom may display the stored at least one message in an existing message style based on the data information.

19 Claims, 12 Drawing Sheets

(56) References Cited

U.S. PATENT DOCUMENTS

| | | | | |
|---|---|---|---|---|
| 2013/0046830 | A1* | 2/2013 | MacDonald | H04L 51/04 |
| | | | | 709/206 |
| 2013/0069969 | A1* | 3/2013 | Chang | H04M 1/72552 |
| | | | | 345/589 |
| 2014/0095673 | A1* | 4/2014 | Mao | H04W 4/203 |
| | | | | 709/219 |
| 2014/0316819 | A1* | 10/2014 | Dunsirn | A61M 5/142 |
| | | | | 705/3 |
| 2016/0371702 | A1* | 12/2016 | Kim | G06Q 30/016 |
| 2017/0032021 | A1* | 2/2017 | Watanachote | H04L 51/32 |
| 2017/0329565 | A1* | 11/2017 | Xiao | H04L 12/00 |

FOREIGN PATENT DOCUMENTS

| | | |
|---|---|---|
| KR | 10-2013-0139468 A | 12/2013 |
| KR | 10-2014-0104967 A | 8/2014 |
| KR | 10-1790896 B1 | 10/2017 |
| KR | 10-1821358 B1 | 1/2018 |

* cited by examiner

FIG. 9

| [MSGEXT_CHAT_ID] : [STRING] ************************************ |
|---|
| [MSGEXT_COUNT] : [Unit] 8 |
| [MSGEXT_ITEM_0] : [STRING] ************************************ |
| [MSGEXT_ITEM_1] : [STRING] ************************************ |
| [MSGEXT_ITEM_2] : [STRING] ************************************ |
| [MSGEXT_ITEM_3] : [STRING] ************************************ |
| [MSGEXT_ITEM_4] : [STRING] ************************************ |
| [MSGEXT_ITEM_5] : [STRING] ************************************ |
| [MSGEXT_ITEM_6] : [STRING] ************************************ |
| [MSGEXT_ITEM_7] : [STRING] ************************************ |

METHOD, SYSTEM, APPARATUS, AND NON-TRANSITORY COMPUTER-READABLE RECORDING MEDIUM FOR PROVIDING A COPIED MESSAGE LIST

CROSS-REFERENCE TO RELATED APPLICATION(S)

This U.S. non-provisional application claims the benefit of priority under 35 U.S.C. § 119 to Korean Patent Application No. 10-2018-0077476 filed on Jul. 4, 2018, in the Korean Intellectual Property Office (KIPO), the entire contents of which are incorporated herein by reference.

BACKGROUND

Field

One or more example embodiments relate to technology for providing a copied message.

Description of Related Art

A general communication tool, for example, an instant messenger, etc., refers to software capable of sending and receiving messages and/or data in real time. A user may register a chat counterpart on a messenger and may exchange messages with a counterpart in real time.

Such a messenger function is generally used not only in a personal computer (PC) but also in a mobile environment of a mobile communication terminal (e.g., smartphone, tablet, etc.). For example, a service system and a mobile messenger of a mobile phone may use a wireless communication network to provide a messenger service between mobile messengers installed on mobile phones.

SUMMARY

One or more example embodiments provide a message providing method, apparatus, system, and/or non-transitory computer readable medium thereof, that may copy a message in a chatroom and may display the copied message in an existing message style when forwarding the copied message to another user.

According to an aspect of at least one example embodiment, there is provided a message providing method implemented by a computer system including at least one processor configured to execute computer-readable instructions included in a memory, the message providing method including receiving, by the at least one processor, a selection of at least one message displayed in a first chatroom of a messenger application; storing, by the at least one processor, the selected at least one message; receiving, by the at least one processor, a selection of a second chatroom of the messenger application; and transmitting, by the at least one processor, the stored at least one message to the second chatroom in response to a selection of the second chatroom, the transmitting including transmitting data information associated with the corresponding original message to the second chatroom. The transmitting the stored at least one message may cause a user-side client installed on an electronic device of a second user of the second chatroom to display the stored at least one message in an existing message style based on the data information.

The storing may include storing the selected at least one message in the memory, the storing including storing text of the selected at least one message in the memory, reading data information associated with the selected at least one message from a chat database in which chat contents of the messenger application are stored, and temporarily storing the read data information in the memory.

The storing may include storing the selected at least one message in a text format, and the transmitting may include pasting the stored at least one message in the text format to a message input box of the second chatroom.

The transmitting may include generating a message object according to a message transport protocol object of the messenger application, the message object generated based on text of the stored at least one message and the data information corresponding to the at least one message, and transmitting the message object to the second chatroom.

The message object may include an expandable data storage capable of carrying custom data associated with a message, and the transmitting may include carrying the data information in the data storage as custom data of the stored at least one message.

The transmitting may include encoding the data information as a key-value pair list for displaying the stored at least one message in the existing message style, and storing the data information as custom data in the message object.

The user-side client may be caused to acquire a message list from the message object, and display the acquired message list.

The user-side client may be caused to display the acquired message list on a user interface region separate from the second chatroom.

The user-side client may be caused to display the acquired message list as a ListView of the second chatroom.

According to an aspect of at least one example embodiment, there is provided a non-transitory computer-readable recording medium storing instructions that, when executed by at least one processor, causes the at least one processor to perform the message providing method.

According to an aspect of at least one example embodiment, there is provided a computer system including a memory; and at least one processor configured to execute computer-readable instructions included in the memory to receive a selection of at least one message displayed in a first chatroom of a messenger application; store the selected at least one message selected; receive a selection of a second chatroom of the messenger application; and transmit the stored at least one message to a second chatroom in response to a selection of the second chatroom, the transmitting including transmitting data information associated with the corresponding original message to the second chatroom to display the stored at least one message in an existing message style based on the data information.

According to some example embodiments, in the case of copying a message in a chatroom and forwarding the copied message to another user of a second chatroom, or a user of a different messaging application, the copied message may be displayed in an existing message style such that the user may easily and conveniently verify the context of the copied message, for example, determine that the style and content of the original message is accurately copied and transmitted to the second user or the user of the different messaging application.

Further areas of applicability will become apparent from the description provided herein. The description and specific examples in this summary are intended for purposes of illustration only and are not intended to limit the scope of the example embodiments.

BRIEF DESCRIPTION OF THE FIGURES

Example embodiments will be described in more detail with regard to the figures, wherein like reference numerals refer to like parts throughout the various figures unless otherwise specified, and wherein:

FIG. 9 illustrates an example of a key-value pair list for a copied message according to at least one example embodiment.

Figure 1:
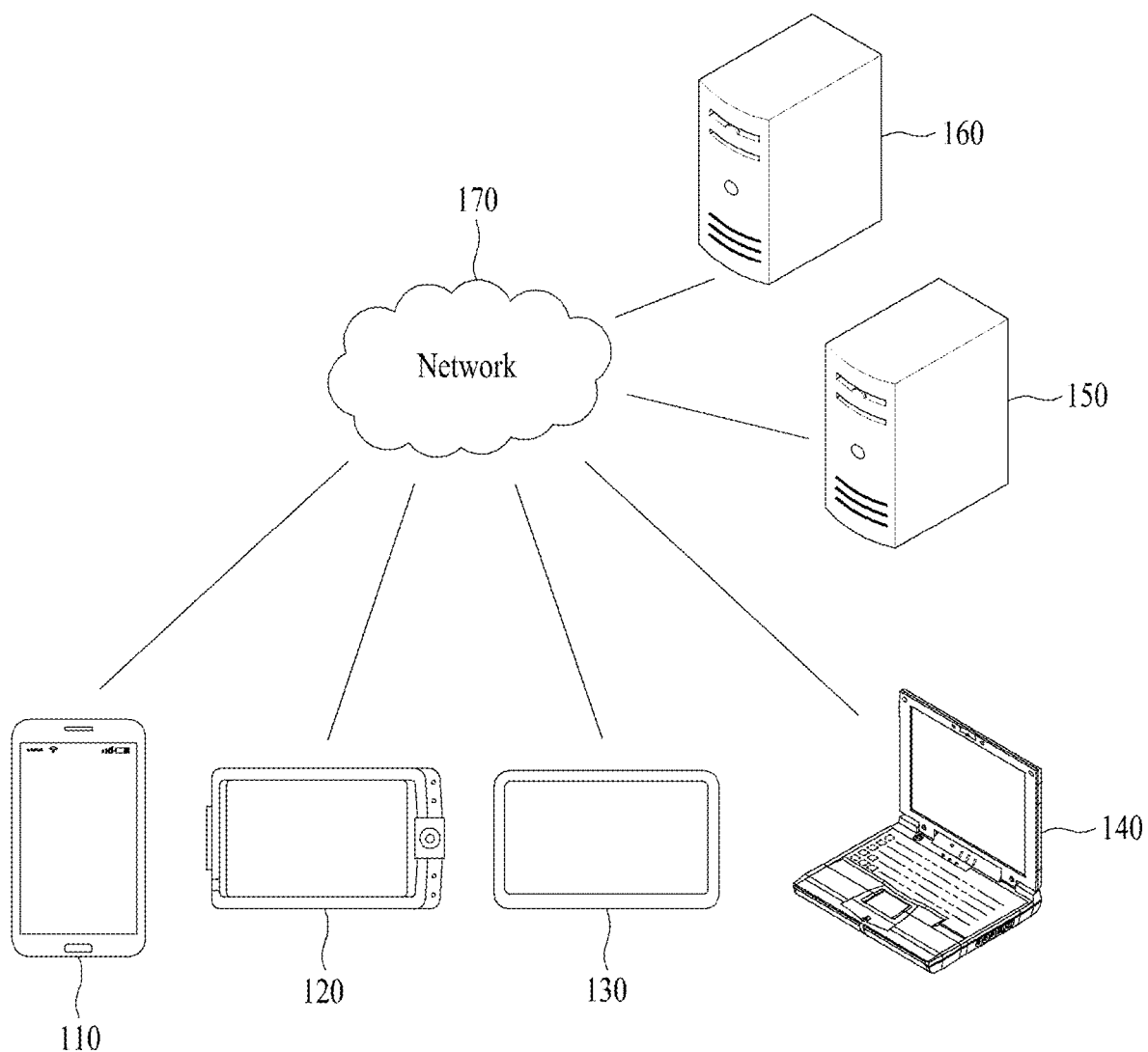
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer recording medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable recording media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable recording media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable recording medium into the one or more storage devices and/or one or more computer processing devices using a drive mechanism. Such separate computer readable recording medium may include a Universal Serial Bus (USB) flash drive, a memory stick, a Blue-ray/DVD/CD-ROM drive, a memory card, and/or other like computer readable recording media. The computer programs, program code, instructions, or some combination thereof, may be loaded into the one or more storage devices and/or the one or more computer processing devices from a remote data storage device via a network interface, rather than via a local computer readable recording medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of the example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be described as one computer processing device; however, one skilled in the art will appreciate that a hardware device may include multiple processing elements and multiple types of processing elements. For example, a hardware device may include multiple processors, multiple processor cores, and/or a processor and a controller. In addition, other processing configurations are possible, such as parallel processors, distributed processors, cloud computing systems, etc.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for providing a message list copied from a chatroom of a messenger.

Example embodiments may relate to copying at least one message of a chatroom and the display of the copied message in an existing message style (e.g., the same message style as the original message, etc.) when forwarding the copied message to another user, which may lead to achieving many advantages in terms of accuracy, convenience, and efficiency.

FIG. 1 is a diagram illustrating an example of a network environment according to at least one example embodiment.

Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto, and may be a lesser or greater number than shown.

Each of the plurality of electronic devices 110, 120, 130, and 140 may be a fixed terminal or a mobile terminal configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet, a game console, a wearable device, an Internet of things (IoT) device, a virtual reality (VR) device, and an augmented reality (AR) device, etc. For example, although FIG. 1 illustrates a shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner and/or in a wireless communication manner.

The communication scheme is not particularly limited and may include a communication method using a near field communication between devices as well as a communication method using a communication network, for example, a mobile communication network, the wired Internet, the wireless Internet, a broadcasting network, and/or a satellite network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides computer readable instructions, codes, files, contents, services, and the like through communication with the plurality of electronic devices 110, 120, 130, and 140 over the network 170. For example, the server 150 may be a system that provides a first service to the plurality of electronic devices 110, 120, 130, and/or 140 over the network 170, and the server 160 may be a system that provides a second service to the plurality of electronic devices 110, 120, 130, and/or 140 over the network 170. In detail, the server 150 may provide a service, for example, a messenger service, desired by a corresponding application as the first service to the plurality of electronic devices 110, 120, 130, and/or 140, etc., through the application of the computer program installed and executed on the plurality of electronic devices 110, 120, 130, and/or 140, etc. As another example, the server 160 may provide a service for distributing a file for installing and executing the application to the plurality of electronic devices 110, 120, 130, and/or 140, etc., as the second service.

Figure 2:
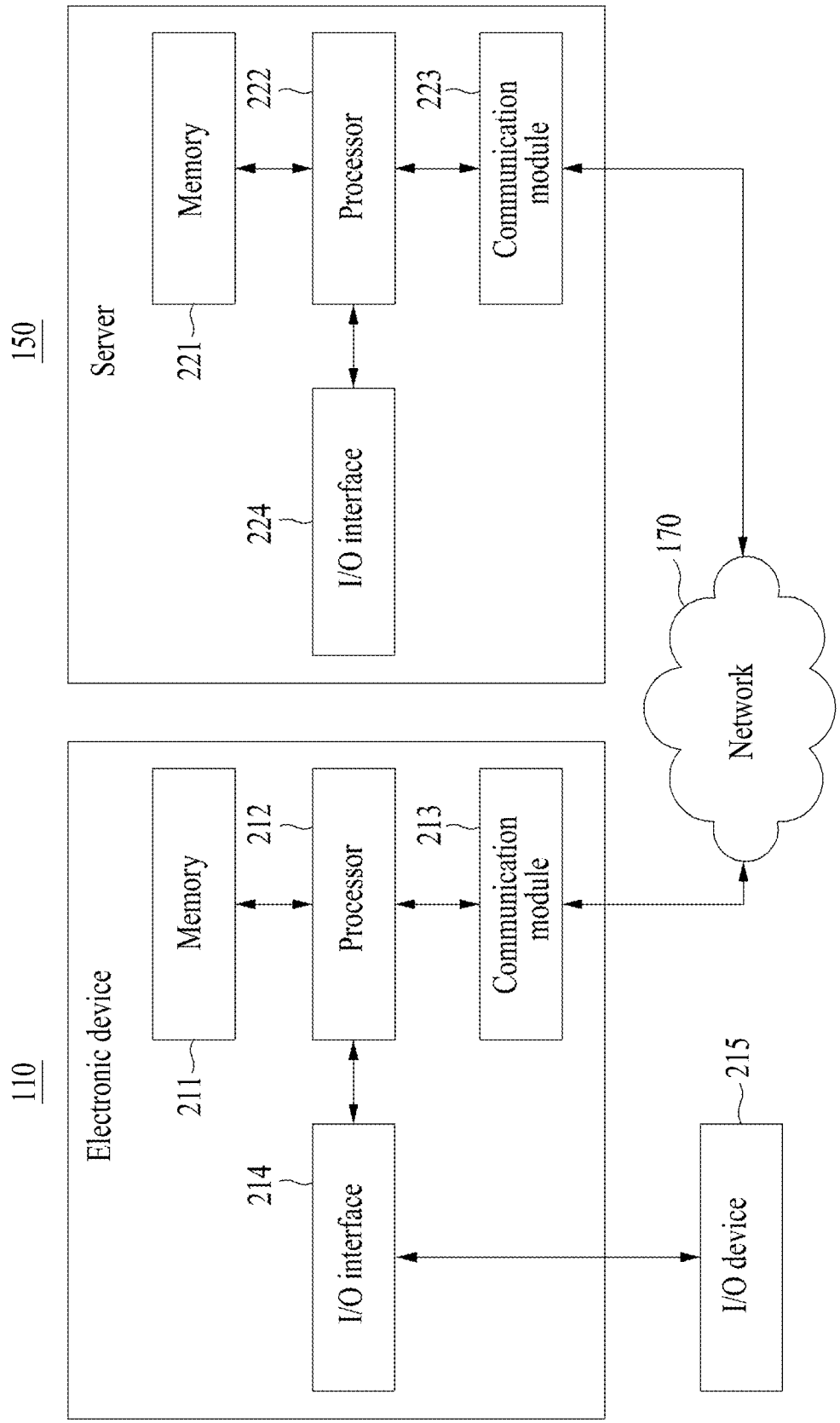
FIG. 2 illustrates an example of an electronic device and a server according to at least one example embodiment.

FIG. 2 is a block diagram illustrating an example of a computer apparatus according to at least one example embodiment. FIG. 2 illustrates a configuration of the electronic device 110 as an example for a single electronic device and illustrates a configuration of the server 150 as an example for a single server, however the example embodiments are not limited thereto. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, etc., and the server 150 may include a memory 221, at least one processor 222 (hereinafter referred to in the singular, but not limited thereto), a communication module 223, and an I/O interface 224, etc., however the example embodiments are not limited thereto. The memory 211, 221 may include a permanent mass storage device, such as random access memory (RAM), a read only memory (ROM), a disk drive, a solid state drive (SSD), and a flash memory, etc., as a non-transitory computer-readable recording medium. The permanent mass storage device, such as ROM, SSD, flash memory, and disk drive, etc., may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable recording medium separate from the memory 211, 221. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable recording medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received computer-readable instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request created based on a program code stored in a storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a recording medium further includable in the electronic device 110.

The I/O interface 214 may be a device used for interface with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device for interface with an apparatus (not shown) for input or output that may be connected to the server 150 or included in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a number of components greater or less than a number of components shown in FIG. 2. For example, the electronic device 110 may include at least a portion of the I/O device 215, or may further include other components, for example, a transceiver, a global positioning system (GPS) module, a camera, a variety of sensors, a database (DB), and the like. As another example, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, example embodiments of a method, apparatus, and/or system for providing a copied message list through a chatroom of a messenger are described.

Figure 3:
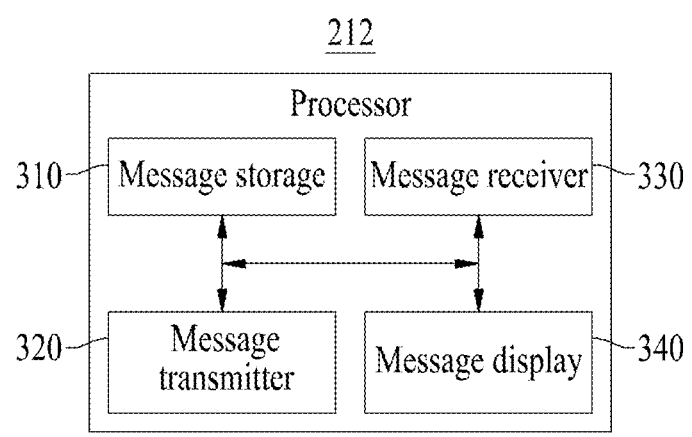
FIG. 3 illustrates an example of components includable in at least one processor of an electronic device according to at least one example embodiment.
Figure 4:
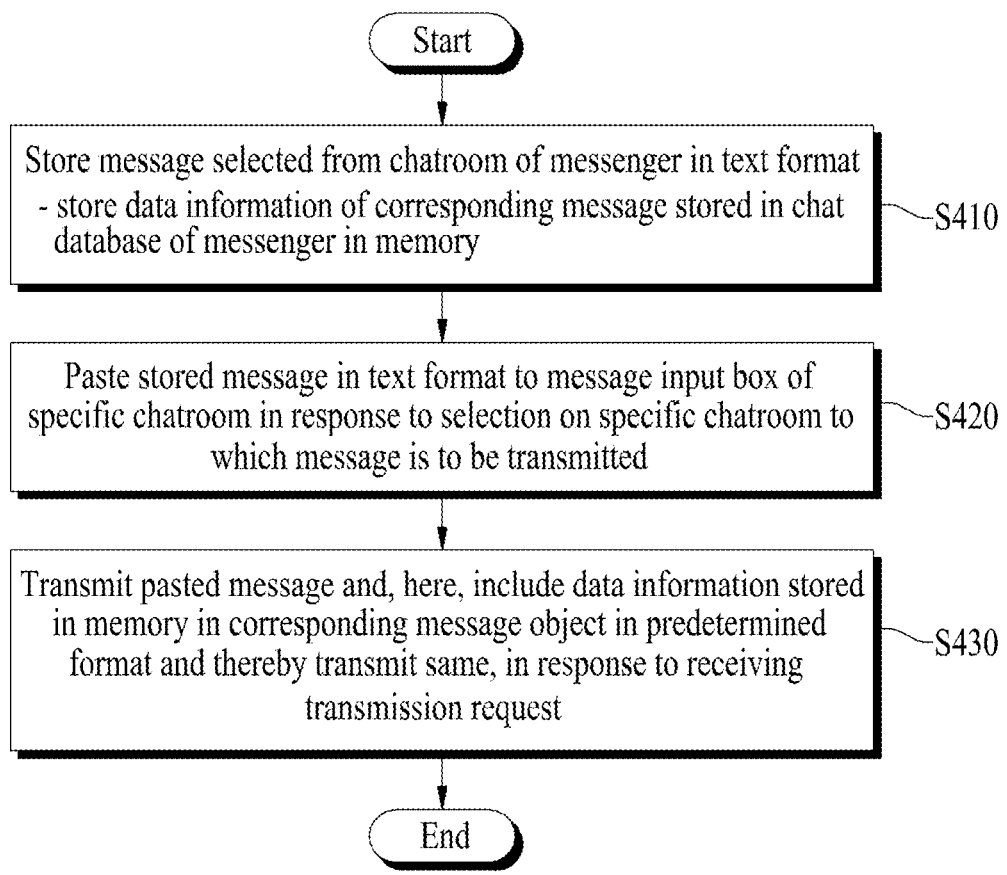
FIGS. 4 and 5 are flowcharts illustrating examples of a method performed by an electronic device according to at least one example embodiment.
Figure 5:
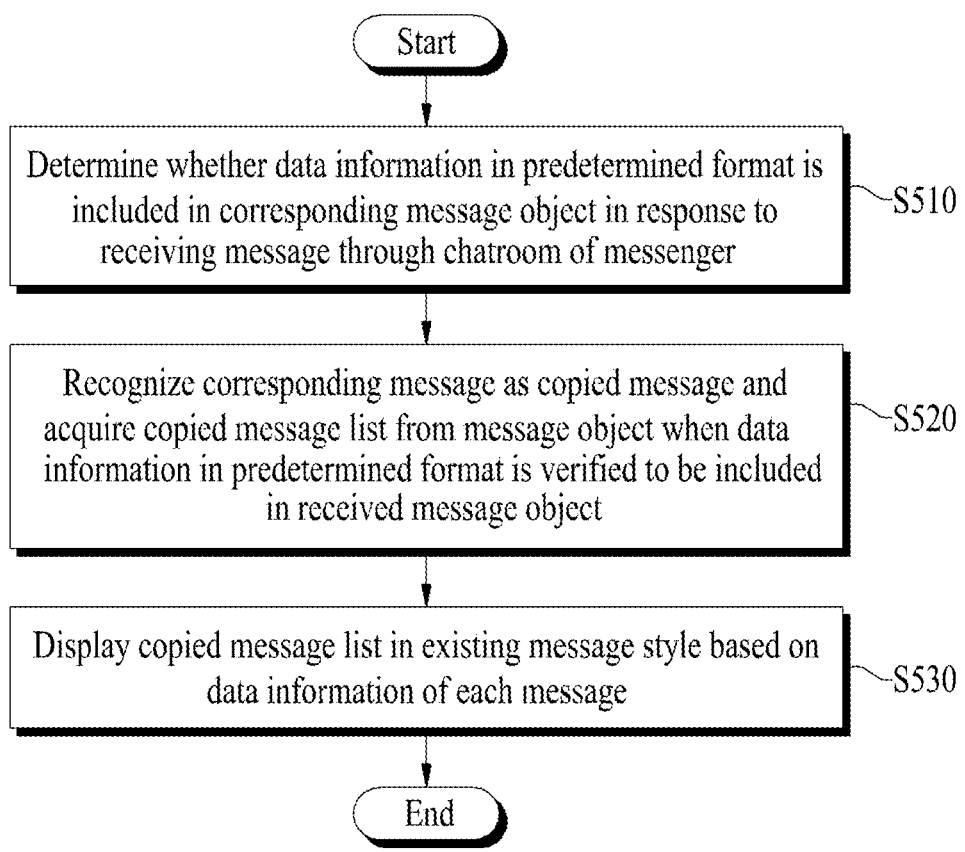

FIG. 3 illustrates an example of components includable in at least one processor of an electronic device according to at least one example embodiment, and FIGS. 4 and 5 are flowcharts illustrating examples of a method performed by an electronic device according to at least one example embodiment.

A computer-implemented message providing system may be configured in the electronic device 110 according to at least one example embodiment. For example, the message providing system may be configured as an independently operating program form and/or may be configured in an in-app form of a specific application to be operable on the specific application and to provide a messenger service through interaction with the server 150 depending on different cases.

The message providing system configured in the electronic device 100 may perform the message providing method in response to a computer-readable instruction provided from the application (e.g., a messenger application, a social networking service application, a communication application, etc.) installed on the electronic device 110. Referring to FIG. 3, to perform the message providing method of FIGS. 4 and 5, the processor 212 of the electronic device 110 may include a message storage 310, a message transmitter 320, a message receiver 330, and a message display 340. Depending on the example embodiment, the components of the processor 212 may be selectively included in or excluded from the processor 212. Also, the components of the processor 212 may be separated or merged for functional representation of the processor 212.

The processor 212 and the components of the processor 212 may control the electronic device 110 to perform operations S410 to S430 included in the message providing method of FIG. 4 and operations S510 to S530 included in the message providing method of FIG. 5, but are not limited thereto. For example, the processor 212 and the components of the processor 212 may be configured to execute at least one computer-readable instruction according to code of at least one program and code of the OS included in the memory 211, etc.

Here, the components of the processor 212 may be representations of different functions of the processor 212 performed by the processor 212 in response to a computer-readable instruction, for example, special purpose computer readable instructions provided from the application (e.g., messenger application, etc.) executed on the electronic device 110, provided from a program code stored in the electronic device 110. For example, the message storage 310 may be used as a functional representation of the processor 212 that controls the electronic device 110 to store a portion of messages selected from the chatroom in response to the computer readable instruction.

FIG. 4 illustrates an example of a client on a message transmission side and FIG. 5 illustrates an example of a client on a message reception side.

The processor 212 may read a necessary instruction from the memory 211 to which computer readable instructions associated with control of the electronic device 110 are loaded. In this case, the read instruction may include an instruction for controlling the processor 212 to perform the following operations S410 to S430 of FIG. 4 or operations S510 to S530 of FIG. 5, but are not limited thereto.

A client operation of FIG. 4 may be initiated through various paths, for example, in response to copying and pasting a message selected from a chatroom to a clipboard; in response to selecting a message from a chatroom using, for example, a drag operation, etc., and manipulating a menu for forwarding the selected message; and in response to the UX (user experience, user interface, etc.) changing to a mode for selecting a message from a chatroom and selecting a message to be forwarded, etc., but the example embodiments are not limited thereto.

Referring to FIG. 4, in operation S410, the message storage 310 may copy a message transmitted over a messaging service by storing at least one message selected from a chatroom of a messenger (e.g., messenger application associated with the messaging service, etc.) in a text format. If a user desires to forward chat content of a message to another user in a chatroom (e.g., the same chatroom or a different chatroom), the user may select the corresponding message through a mouse drag action, a selection tool or menu, and the like. Here, the message storage 310 may store the selected message in a text format, for example, <created time|sender|message content>. For example, if a message 'hi' sent from a user b at 9:17 pm is selected in a chatroom between a user a and the user b, the selected message 'hi' may be stored in a text format, such as <21:17 user b hi>. In particular, the message storage 310 may read data information of the selected message from a database (e.g., a messaging service database, etc.) that stores the entire chat contents of the messenger and may store the read data information in the memory 211. The data information refers to message related data and may include, for example, chatroom identification information, sender information, a message content type, message identification information, a created time, message content, and/or location information, etc., but are not limited thereto.

In operation S420, the message storage 310 may paste the message in the text format stored in operation S410, that is, the copied message to a message input box of a specific chatroom in response to a selection on the specific chatroom to which the copied message is to be transmitted. The copied message may be pasted to an external program different from the messenger (e.g., an email program, a text message program, a chat program, a videochat program, a web browser, a word document processing application, an image viewing/editing application, a spreadsheet application, etc.) in addition to the messenger. If the copied message is pasted to the message input box of the chatroom or the external program, the message in the text format is pasted as is. In the case of performing paste in the chatroom of the messenger, the message storage 310 may verify whether data information stored in the memory 211 in operation S410 is present. Since the data information and storage content at a time at which the message is copied are stored as a single pair, the message storage 310 may compare the currently copied message and the data information stored in the memory 211 and may determine whether the copied message and the stored data information match (e.g., are true copies of one another, etc.). If the copied message and the data information stored in the memory 211 do not match, the message storage 310 may not perform the paste operation, and otherwise if the copied message and the data information do match, the message storage 310 may perform the paste operation.

In operation S430, in response to receiving a transmission request in a state in which the copied message is pasted to the message input box of the specific chatroom, the message transmitter 320 may transmit the message pasted to the message input box to an electronic device of a user included in the specific chatroom, but the example embodiments are not limited thereto. Here, the message transmitter 320 may transmit the message by including at least a portion of the data information stored in the memory 211 in a corresponding message object associated with the application (e.g., messenger application, etc.) corresponding to the specific chatroom. For example, if the copied message matches the data information stored in the memory 211, the message transmitter 320 may compress and encode the data information stored in the memory 211 in a specific format and/or a desired data format, and may store the encoded data information in a custom data space of the message object. The message object refers to a message transport protocol object of the messenger and a contentMetaData area may be assigned as an expandable data space capable of carrying a variety of custom data within a message transport protocol. When transmitting the copied message, the message transmitter 320 may compress and encode the data information of the copied message in a predetermined (or, alternatively, desired) format and may store the data information in the contentMetaData area and, at the same time or sequentially, transmit the data information. Here, contentMetaData may include a key-value pair list including a key and a value associated with the key. Data may be carried by compressing and encoding the data as a single key-value pair for each message, but the example embodiments are not limited thereto. contentMetaData refers to a kind of metadata predefined and/or set between the server 150 and a messenger client and may be used as a key-value menu capable of customizing random data with respect to a corresponding message. For example, contentMetaData of the message object may be used as a key-value dictionary required to display the copied message in an existing message style, which may lead to achieving an expansible ListView function for the copied message, but is not limited thereto.

Referring to FIG. 5, in operation S510, in response to receiving a message through a chatroom of a messenger, the message receiver 330 may determine whether data information in a predetermined (or, alternatively, desired) format is included in a corresponding message object. That is, for example, the message receiver 330 may verify whether a contentMetaData key-value defined as custom data of the copied message is present in the received message object, etc.

In operation S520, when the data information in the format is verified to be included in the received message object, the message receiver 330 may recognize the corresponding message as the copied message and may acquire a copied message list from the message object. When a contentMetaData key-value defined as the custom data of the copied message is verified to be present in the received message object, the message receiver 330 may decode and restore the message object. If the decoding operation is repeated a number of times corresponding to the number of key-value pairs, the message receiver 330 may acquire the copied message list from the received message object.

In operation S530, in response to a user request for the copied message list, the message display 340 may display the copied message list in an existing message style based on data information of each message. That is, in the case of displaying the copied message, the message display 340 may apply an existing interface element, for example, a speech bubble, a desired font, a desired color, a desired emoji, a desired image (e.g., a sticker, a GIF, a video, etc.), a desired sound file, etc., applied to the copied original message and display the message in the new chatroom in an existing style (e.g., the same style as the original message) as is. The message display 340 may forward the copied and then transmitted message list to a ListView window to be drawn on a screen as if the copied message is called from the server 150 or a chat database of the messenger and thereby displayed. For example, the message display 340 may display a ListView of a copied message through a layer or a chatroom separate from a chatroom from which the message is received. As another example, the message display 340 may display a copied message list as a message list of a chatroom through which a message is received. That is, the message display 340 may also display a copied message list as a ListView within a ListView of a chatroom through which the message is received.

Figure 6:
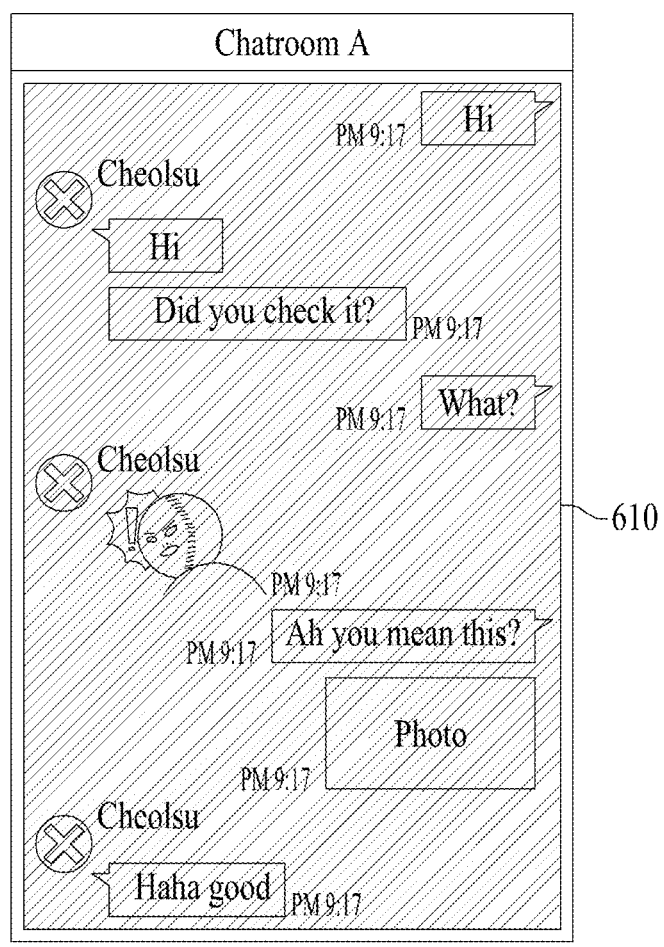
FIGS. 6 and 7 illustrate examples of describing a message copy process according to at least one example embodiment.
Figure 7:
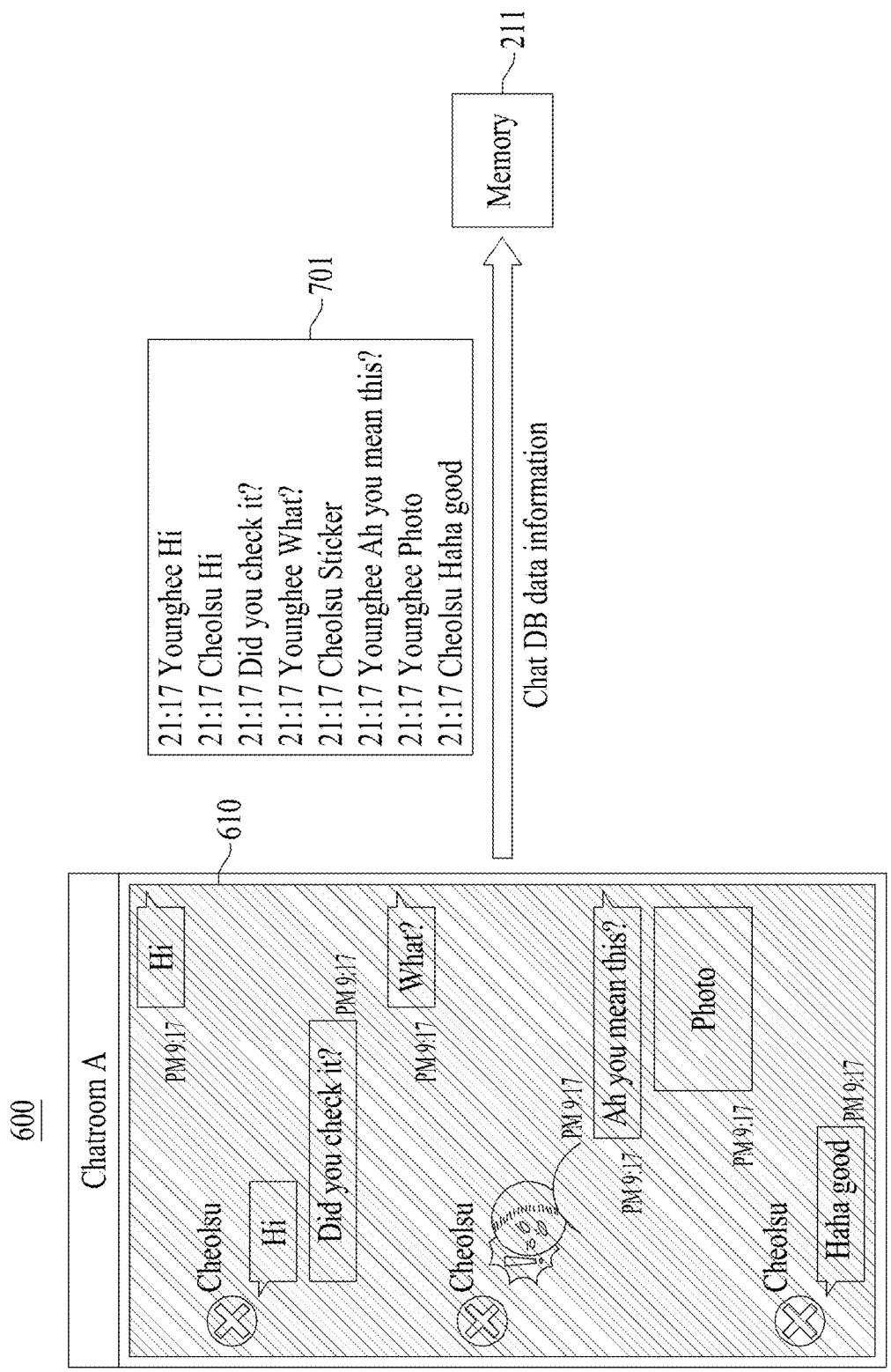

FIGS. 6 and 7 illustrate examples of describing a message copy process according to at least one example embodiment.

Referring to FIG. 6, a user may select a message included in an area 610 as a message to be forwarded to another user by designing the area 610 through a drag action in a chatroom 600.

Here, although it is described that a message is selected using the drag action, it is provided as an example only. Using a selection tool, a menu, a gesture, etc., supported by a messenger, the user may select at least one message from among messages included in the chatroom 600.

Referring to FIG. 7, in response to a user request, for example, a request for copy, forward, etc., in a state in which at least one message is selected in the chatroom 600, the message storage 310 may create and store the selected at least one message 701 in a text format and, at the same time or sequentially, may temporarily store, in the memory 211, data information for each message stored in a chat database of the messenger. Here, the data information may include, for example, chatroom identification information, sender information, a message content type, message identification information, a created time, message content, and/or location information, etc., but is not limited thereto.

Figure 8:
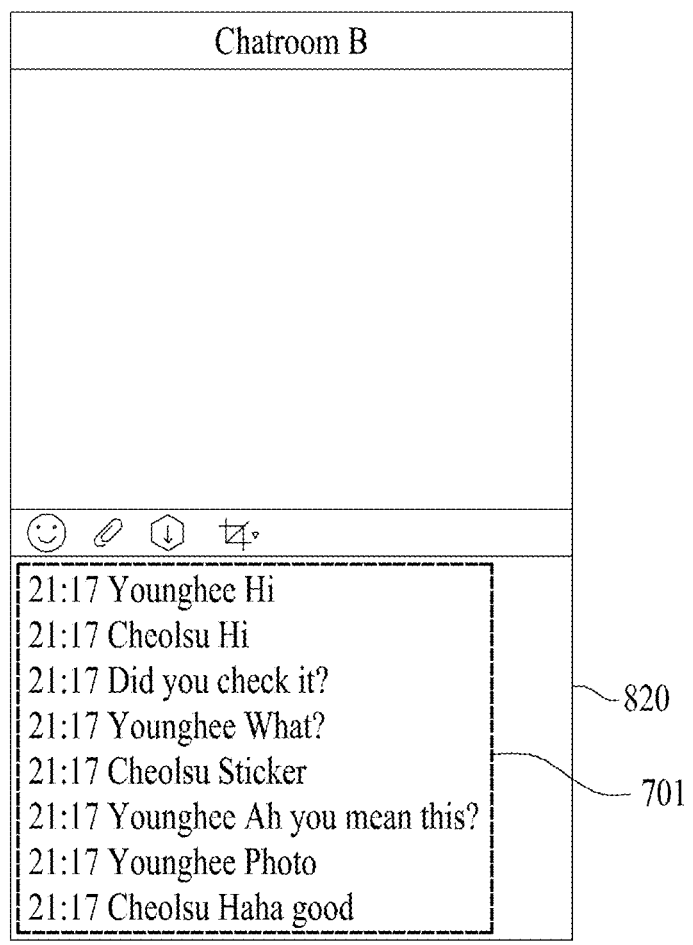
FIG. 8 illustrates an example of describing a message paste process according to at least one example embodiment.

FIG. 8 illustrates an example of describing a message paste process according to at least one example embodiment.

Referring to FIG. 8, a user may specify a chatroom 800 to which a copied message is to be forwarded from among a plurality of chatrooms of a messenger, but the example embodiments are not limited thereto, and the user may specify a recipient and/or chatroom of a different application, etc. Here, the chatroom 800 may be identical to the chatroom 600 in which the message is selected or may be another chatroom selected by the user. Once the chatroom 800 to which the copied message is to be forwarded is specified, the message storage 310 may paste the copied at least one message 701 in the text format to a message input box 820 of the specified chatroom 800 that is a specific chatroom.

Even in the case of pasting a copied message to another external program, such as a notepad and a document program in addition to a chatroom of the messenger, the message storage 310 may paste the copied at least one message 701 in the text format.

In response to receiving a transmission request in a state which a message paste operation is performed on the message input box 820 of the specified chatroom 800, the message transmitter 320 may transmit the at least one message 701 pasted to the message input box 820 to an electronic device of the user included in the corresponding chatroom 800. Here, the message transmitter 320 may transmit the at least one message 701 by including at least a portion of data information stored in the memory 211 in a corresponding message object.

To forward data information of a copied message with the corresponding copied message, the message transmitter 320 may use a contentMetaData area that is an area assigned as a custom data space of the message object that is a message transport protocol object. Here, contentMetaData may include a key-value pair list, and the message transmitter 320 may carry data (e.g., data related to colors, fonts, images, sounds, etc.) required to display the copied message in an existing message style as a key-value pair including a key and a value of the key as represented by Table 1.

TABLE 1

| Key | Description |
|---|---|
| MSGEXT_CHAT_ID | Identification information used to identify a chatroom in which a copied message is included |
| MSGEXT_CHAT_ID | number of copied messages |
| MSGEXT_ITEM_{NUM} | data for each copied message |

An example of MSGEXT_ITEM representing data of each message is represented by Table 2, and may be provided as a text syntax separated using a comma.

MESSAGE_ID (message identification information), FROM (sender information), CONTENT_TYPE (message content type), -continued CREATEDTIME (created time), TEXT (message content), ..., LOCATION (location information), CONTENTMETADATA (content identification information), ...

Messages exchanged through a chatroom may include a variety of contents, for example, photos, videos, sounds, stickers (emoticons), files, contacts, locations, uniform resource links (URLs), and/or schedules, etc., in addition to text. MSGEXT_ITEM syntax for each message may include information on content of a corresponding message.

The message transmitter 320 may compress and encode message data as a key-value pair list and may carry and forward the encoded message data as contentMetaData of a message object, but the example embodiments are not limited thereto.

contentMetaData of the copied message in the chatroom 600 of FIG. 6 may include MSGEXT_CHAT_ID and MSGEXT_COUNT of FIG. 9 and may also include MSGEXT_ITEM for each message. The message transmitter 320 may compress and encode MSGEXT_ITEM that is a key-value of a single pair per single message and thereby forward the same.

Figure 10:
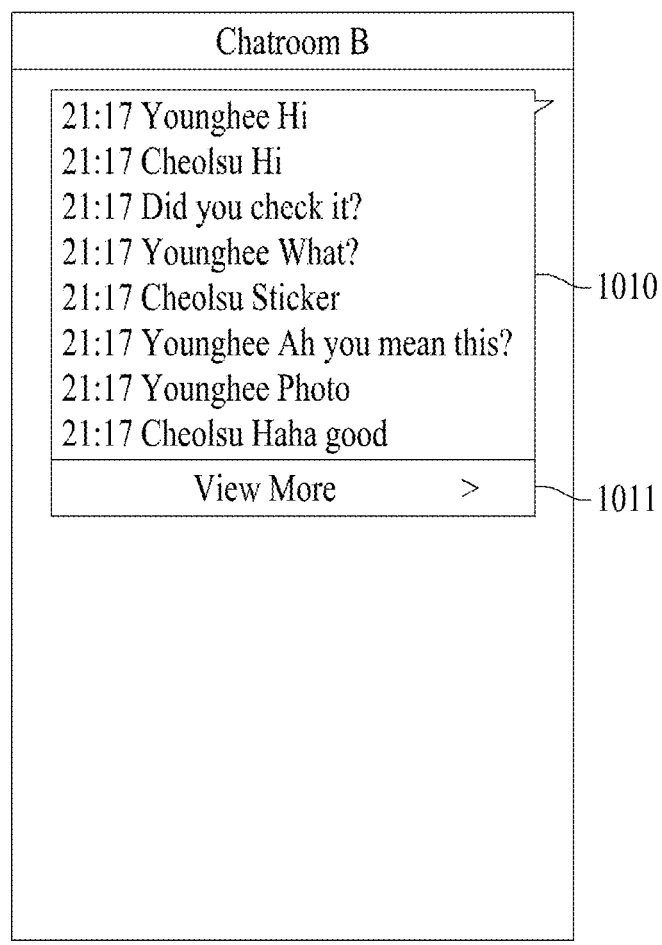
FIGS. 10 to 12 illustrate examples of describing a process of receiving and displaying a message according to at least one example embodiment.
Figure 11:
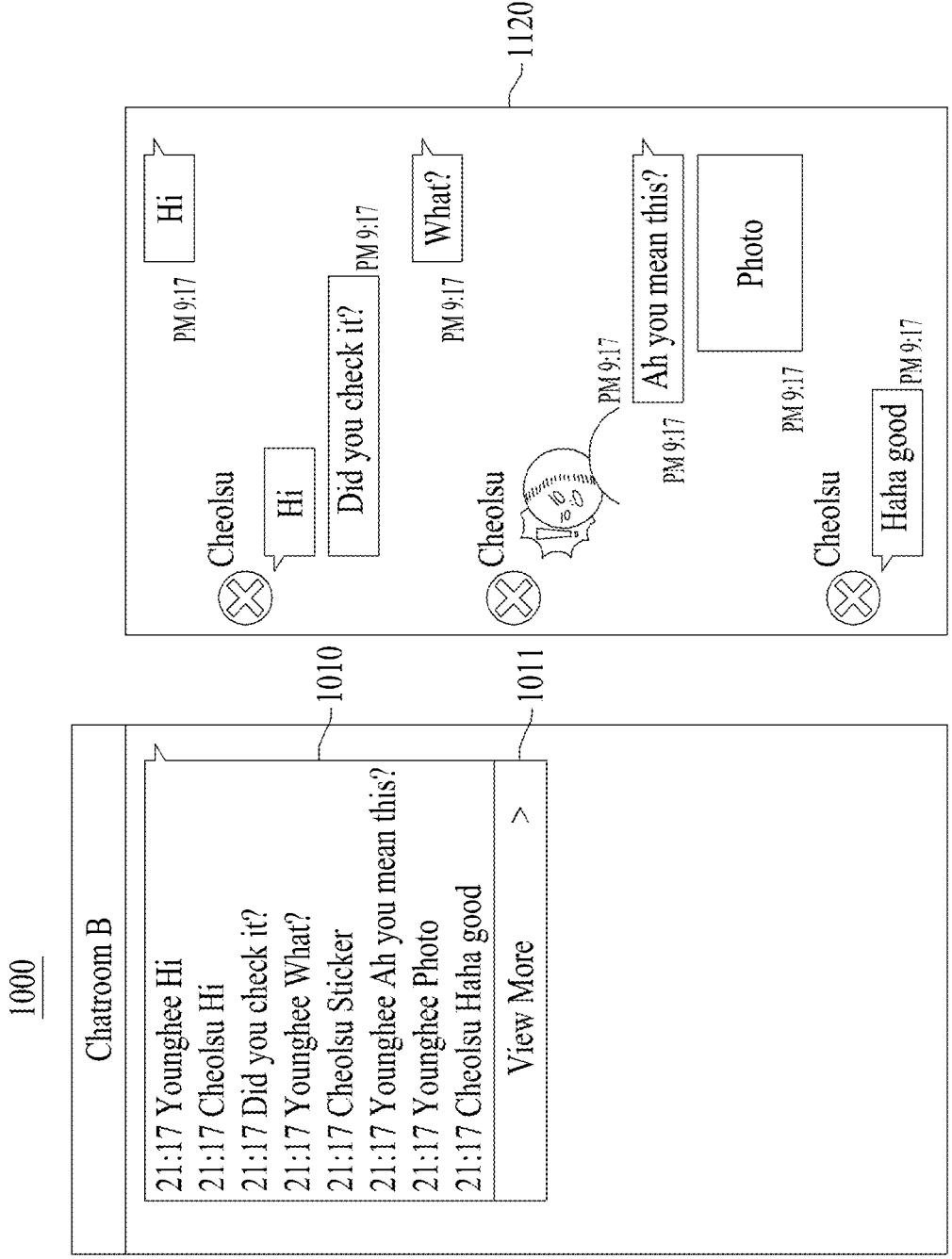
Figure 12:
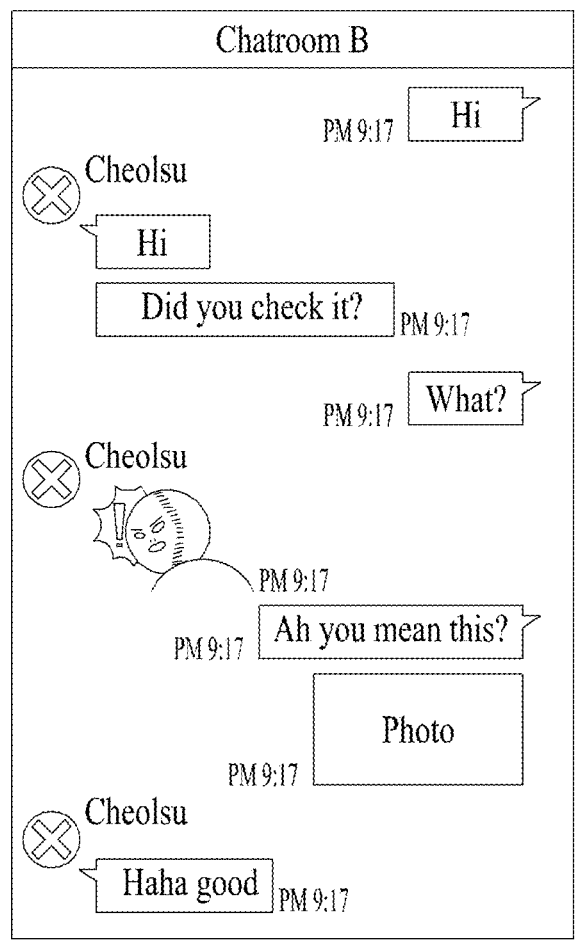

FIGS. 10 to 12 illustrate examples of describing a process of receiving and displaying a message according to at least one example embodiment.

Referring to FIG. 10, in response to receiving a message 1010 through a chatroom 1000 of a messenger, the message receiver 330 may verify whether a contentMetaData key-value defined as custom data of a copied message is present in a received message object, and, if the key-value is present, may display the received message 1010 in a form indicating the copied message. For example, once the message 1010 is verified as the copied message (e.g., for example, including determining whether the desired style of the original message matches the style of the copied message, etc.), the message receiver 330 may further provide a "View More" user interface (UI) 1011 for providing a message expansible ListView for the message 1010.

In response to a selection from the user on the "View More" UI 1011, the message receiver 330 may acquire a copied message list by decoding a contentMetaData key-value of the message object, but the example embodiments are not limited thereto. Here, the message display 340 may forward the copied message list acquired from the message object to a ListView window to be displayed on a screen. For example, referring to FIG. 11, in response to a section from the user on the "View More" UI 1011 with respect to the received message 1010 through the chatroom 1000, the message display 340 may display ListView of the copied message on an area 1120 separate from the chatroom 1000.

According to at least one example embodiment, the message receiver 330 may verify whether a received message is a copied message at a point in time at which the message is received through the chatroom 1000 of the messenger, and may acquire a copied message list by decoding a contentMetaData key-value of a corresponding message object. Accordingly, referring to FIG. 12, the message display 340 may immediately display the copied message list as ListView of the chatroom 1000 through which the corresponding message is received.

According to one or more example embodiments, in the case of copying a message in a chatroom and forwarding the copied message to another user, the copied message may be displayed in an existing message style (e.g., the same message style as the original message) such that the user may easily and conveniently verify context of the copied message.

The systems and/or apparatuses described herein may be implemented using hardware components and/or a combination of hardware components and software components. For example, a processing device may be implemented using one or more general-purpose computers loaded with special purpose computer readable instructions, or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer recording medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to one or more of the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A message providing method implemented by a computer system comprising at least one processor configured to execute computer-readable instructions included in a memory, the message providing method comprising:
   receiving, by the at least one processor, a selection of at least one message displayed in a first chatroom of a messenger application from a first electronic device of a first user;
   storing, by the at least one processor, the selected at least one message;
   receiving, by the at least one processor, a selection of a second chatroom of the messenger application; and
   transmitting, by the at least one processor, the stored at least one message to the second chatroom in a text format in response to a selection of the second chatroom, the transmitting including transmitting data information associated with the corresponding original message to the second chatroom, the data information including message style information of the corresponding original message, and
   the transmitting the stored at least one message causes a user-side client installed on a second electronic device of a second user of the second chatroom to display the stored at least one message in an existing message style of the corresponding original message based on the data information.

2. The message providing method of claim 1, wherein the storing comprises:
   storing the selected at least one message in the memory, the storing including storing text of the selected at least one message in the memory;
   reading the data information associated with the selected at least one message from a chat database in which chat contents of the messenger application are stored; and
   temporarily storing the read data information in the memory.

3. The message providing method of claim 1, wherein
   the storing the selected at least one message comprises storing the selected at least one message in the text format; and
   the transmitting the stored at least one message comprises pasting the stored at least one message in the text format to a message input box of the second chatroom.

4. The message providing method of claim 1, wherein the transmitting the stored at least one message comprises:
   generating a message object according to a message transport protocol object of the messenger application, the message object generated based on text of the stored at least one message and the data information corresponding to the at least one message; and
   transmitting the message object to the second chatroom.

5. The message providing method of claim 4, wherein
   the message object includes an expandable data storage capable of carrying custom data associated with a message; and
   the transmitting the stored at least one message comprises carrying the data information in the data storage as custom data of the stored at least one message.

6. The message providing method of claim 4, wherein the transmitting the stored at least one message comprises:
encoding the data information as a key-value pair list for displaying the stored at least one message in the existing message style; and
storing the data information as custom data in the message object.

7. The message providing method of claim 4, wherein the transmitting the stored at least one message further causes the user-side client to:
acquire a message list from the message object; and
display the acquired message list.

8. The message providing method of claim 7, wherein the transmitting the stored at least one message further causes the user-side client to display the acquired message list on a user interface region separate from the second chatroom.

9. The message providing method of claim 7, wherein the transmitting the stored at least one message further causes the user-side client to display the acquired message list as a ListView of the second chatroom.

10. A non-transitory computer-readable recording medium storing computer readable instructions that, when executed by at least one processor, causes the at least one processor to perform the message providing method of claim 1.

11. A computer system comprising:
a memory; and
at least one processor configured to execute computer-readable instructions to,
receive a selection of at least one message displayed in a first chatroom of a messenger application from a first user;
store the selected at least one message;
receive a selection of a second chatroom of the messenger application; and
transmit the stored at least one message to a second chatroom in a text format in response to a selection of the second chatroom, the transmitting including transmitting data information associated with the corresponding original message to the second chatroom, the data information including messages style information of the corresponding original message, and
the transmitting the stored at least one message causes a user-side client installed on an electronic device of a second user of the second chatroom to display the stored at least one message in an existing message style of the corresponding original message based on the data information.

12. The computer system of claim 11, wherein the at least one processor is configured to:
store the selected at least one message in the memory, the storing including storing text of the selected at least one message in the memory;
read the data information associated with the selected at least one message from a chat database in which chat contents of the messenger application are stored; and
temporarily store the read data information in the memory.

13. The computer system of claim 11, wherein the at least one processor is configured to:
store the selected at least one message in the text format; and
paste the stored at least one message in the text format to a message input box of the second chatroom.

14. The computer system of claim 11, wherein the at least one processor is configured to:
generate a message object according to a message transport protocol object of the messenger application, the message object generated based on text of the stored at least one message and the data information corresponding to the at least one message; and
transmit the message object to the second chatroom.

15. The computer system of claim 14, wherein
the message object includes an expandable data storage capable of carrying custom data associated with a message; and
the at least one processor is further configured to carry the data information in the data storage as custom data of the stored at least one message.

16. The computer system of claim 14, wherein the at least one processor is configured to:
encode the data information as a key-value pair list for displaying the stored at least one message in the existing message style; and
store the data information as custom data in the message object.

17. The computer system of claim 14, wherein the user-side client is configured to:
acquire a message list from the message object; and
display the acquired message list.

18. The computer system of claim 17, wherein the user-side client is configured to display the acquired message list on a user interface region separate from the second chatroom.

19. The computer system of claim 17, wherein the user-side client is configured to display the acquired message list as a ListView of the second chatroom.

\* \* \* \* \*